July 6, 1965

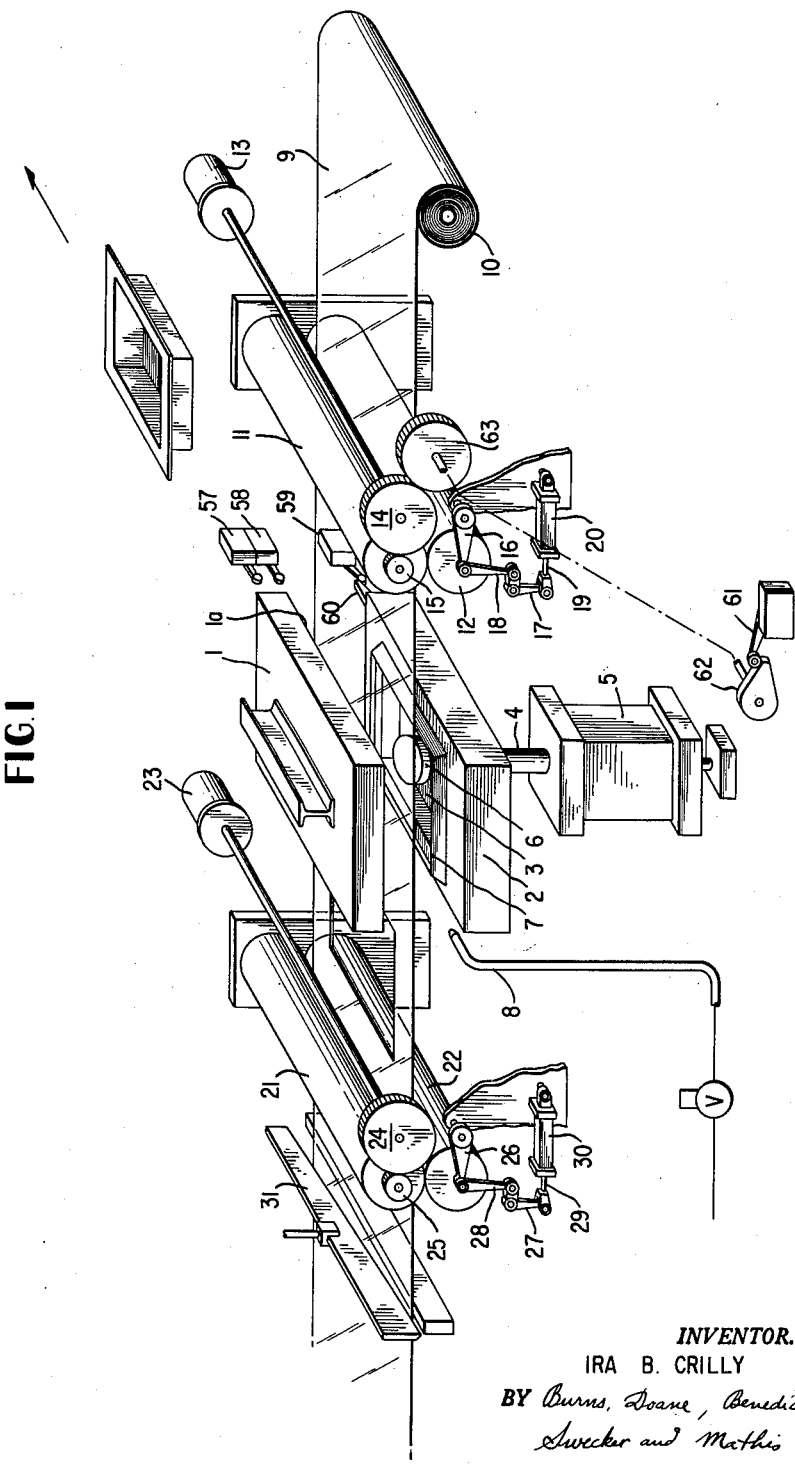

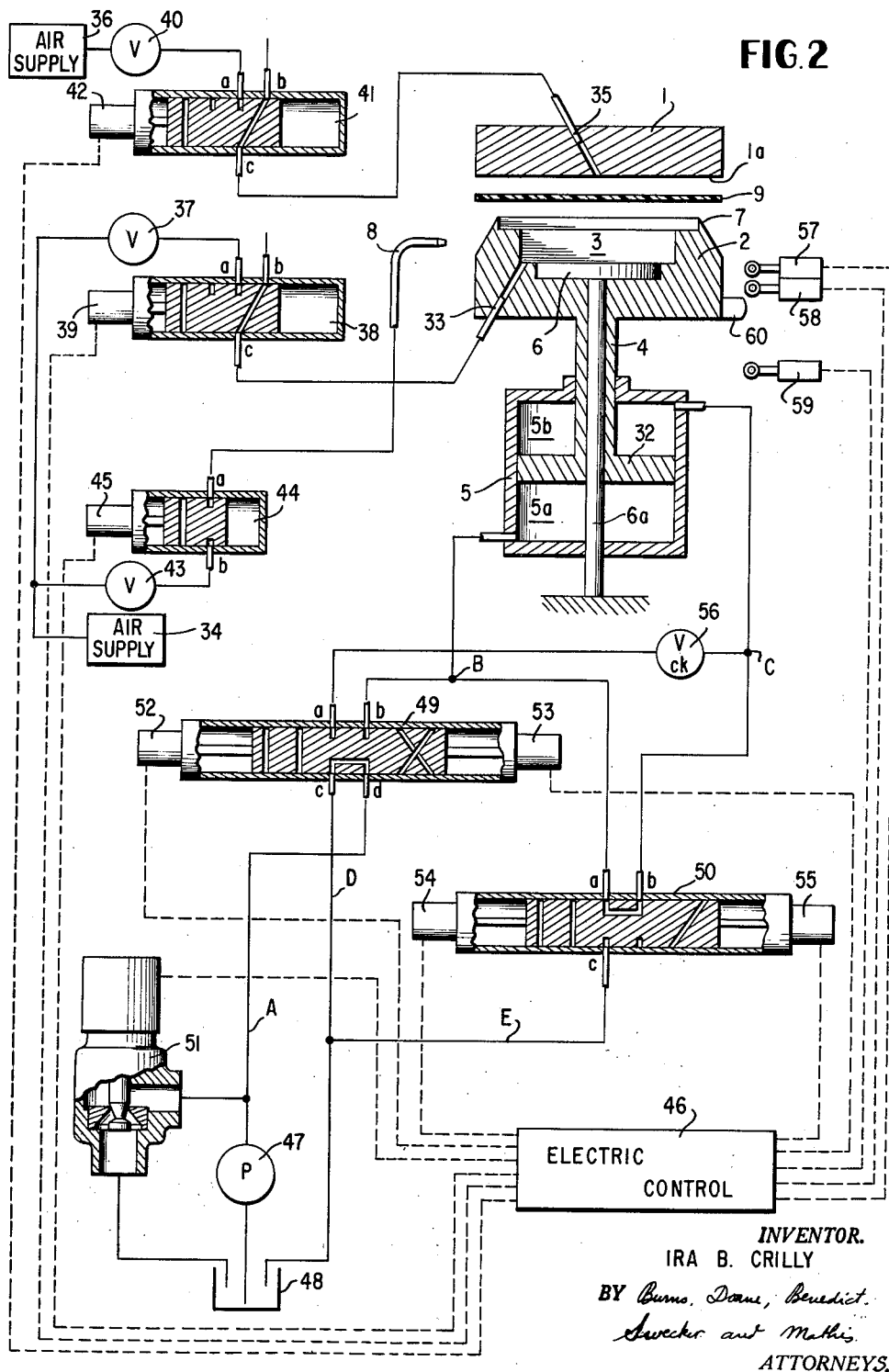

I. B. CRILLY 3,193,599

METHOD AND APPARATUS FOR MOLDING
THERMOPLASTIC SHEET MATERIAL

Filed Sept. 1, 1961

| STEPS | OPERATIONS | ACTUATING MEANS | MOLD POSITIONS |
|---|---|---|---|
| (1) MOLD ADVANCE | a) MOLD STARTS UP AT LOW SPEED<br>b) MOLD ADVANCES AT HIGH SPEED<br>c) MOLD IS SLOWED TO LOW SPEED | a) MAIN CONTROL CIRCUIT<br>b) TIMER<br>c) LIMIT SWITCH | |
| (2) WEB HEATING | STRESS AIR APPLIED AND MOLD PRESSURE ADJUSTED | LIMIT SWITCH | |
| (3) WEB FORMING | FORM AIR APPLIED AND MOLD PRESSURE RAISED | TIMER | |
| (4) WEB CUTTING | MOLD PRESSURE RAISED | TIMER | |
| (5) MOLD WITHDRAWAL | MOLD MOVES DOWN | TIMER | |
| (6) ARTICLE EJECTION | ARTICLE SEPARATED FROM MOLD AND MOVED OUT OF MACHINE | LIMIT SWITCH | |

FIG. 3 TYPICAL CYCLE OF MOLDING OPERATION

INVENTOR.
IRA B. CRILLY
BY Burns, Doane, Benedict,
Swecker and Mathis
ATTORNEYS

United States Patent Office

3,193,599
Patented July 6, 1965

3,193,599
METHOD AND APPARATUS FOR MOLDING THERMOPLASTIC SHEET MATERIAL
Ira B. Crilly, Simsbury, Conn., assignor to Emhart Corporation, Bloomfield, Conn., a corporation of Connecticut
Filed Sept. 1, 1961, Ser. No. 135,493
3 Claims. (Cl. 264—90)

This invention pertains to a method and apparatus for molding plastic material. Specifically, it is related to the molding of thermoplastic sheet material.

In the molding of plastic articles from thermoplastic sheet stock, it has been found particularly advantageous to employ a technique wherein a portion of sheet material is clamped between a heated platen and a cavity-containing die. The clamped sheet portion is heat softened through contact with the platen and is then fluid pressure formed into the die cavity. If desired, the molded portion may be severed from the sheet stock by increasing the clamping pressure of the die to cause the die to penetrate the sheet. This method and apparatus is generally disclosed in the United States Willson Patent No. 2,926,385.

In conducting molding operations of the type generally set forth in the Willson patent, several operational problems have arisen. Because of these problems, optimum efficiency in molding operations has not been achieved.

An initial problem resides in the movement of the movable mold member, usually the die, into clamping contact with the sheet material to be formed. To achieve maximum molding speed, particularly during a continuous operation, it is necessary that the die reciprocate rapidly toward and away from the heating platen. In attaining this rapid translation rate, an inordinate power level has frequently been utilized. In addition, there has been present distinct likelihood of either inflicting damage to the die and platen as they are brought into initial contact or of inadvertently severing or fracturing the plastic material.

Particularly vexing difficulties have occurred during the molding operation itself. The die, in clamping the sheet while it is being heat softened, has often tended to penetrate the softened sheet before forming has been initiated or to at least weaken the sheet about its clamped periphery such that the portion of the sheet being fluid formed has tended to separate from the remainder of the sheet during the forming operation. Additionally, during the fluid forming operation when high pressure air was introduced into the closed platen and die to force the clamped sheet portion into the die cavity, there has been a tendency for the die to separate from the clamped sheet so as to allow slippage of the clamped portion during the fluid forming.

Through the invention herein presented there is provided a method and apparatus capable of eliminating the foregoing operational problem inherent in previously known thermoplastic sheet molding techniques.

It is a principal object of the invention to provide such a method and apparatus by means of which optimum force may be applied to a moving mold member, such as a cavity containing die, in response to the critical requirements of individual phases of the overall molding operation.

It is a further object of the invention to provide such a method and apparatus in which the motivating force applied to the movable mold member may be selectively subjected to changes of a predetermined ratio, which ratio changes may be further modified so as to afford maximum flexibility in the programming of forces to be applied to the member during an automatic molding cycle.

An additional object of the invention is to provide an arrangement for applying force to a movable mold member which efficiently overcomes the inertia of the member, thereafter effects rapid member movement, and effectively decelerates the member prior to its reaching clamping engagement with a plastic sheet portion interposed between this member and a stationary member.

It is a still further object of the invention to present a method and apparatus, as heretofore described, in which the clamping force applied to a movable mold member is adjusted during the heat softening of a clamped thermoplastic sheet portion so as to minimize the likelihood of sheet penetration, and in which the clamping pressure is thereafter increased during the fluid forming of the sheet to prevent slippage of the clamped sheet portion.

A final object of the invention is to provide a method and apparatus for molding thermoplastic sheet material which is characterized by operating components of a structurally simple nature so as to minimize fabrication and maintenance problems, which is reliable in operation, and which may readily be manipulated.

To accomplish the foregoing objectives, there is envisioned a method of molding thermoplastic material comprising the initiating of low velocity movement of one mold member toward another mold member, the accelerating of the movement of the one member toward the other member, and the decelerating of this movement before the one member engages and clamps a portion of plastic sheet material against the other member. A further facet of the overall method pertains to the variation in clamping forces applied to the one member. As the one member moves into clamping engagement with a portion of the sheet material, the force applied to the one member is adjusted to provide a clamping pressure which will decrease the likelihood of the one member penetrating the plastic sheet while it is being heat softened. Thereafter the clamping pressure is increased while the clamped portion is fluid formed to offset the likelihood of slippage of the clamped sheet portion occurring during this phase.

The apparatus envisioned for performing this method includes a first mold member and a second mold member reciprocably mounted for movement toward and away from the first mold member. Means are provided for initiating movement of the second mold member toward the first mold member at relatively low velocity and with a relatively high force applied to the second mold member. Means are also included for accelerating the initial movement of the second mold member to a relatively high velocity with a relatively low force being applied thereto. Further means enable the deceleration of the second mold member before it engages and clamps a portion of plastic sheet material against the first mold member.

For varying the clamping pressures applied by the second mold member, there are included means for adjusting the force applied to the second mold member such that the second mold member may clamp the sheet portion for thermal softening without penetrating the sheet, and means for increasing the force applied to the second mold member while the clamped sheet portion is fluid pressure formed.

In a preferred embodiment, the second mold member is supported on a piston rod for reciprocable movement toward and away from the first mold member, which piston rod extends from an hydraulic fluid actuated, cylinder housed, piston. Conduit means are provided for transmitting pressurized fluid from a convenient source to the piston housing cylinder. First valve means are employed for directing the fluid against either the head or rod end of the piston. Second valve means are employed for selectively placing the piston head and piston rod ends of the cylinder in fluid communication, while third valve means are utilized for varying the level of fluid pressure in the conduit means. Suitable control means are included for actuating the various valve means according to a predetermined sequence to vary the fluid pressures imposed upon the piston.

In describing the method and apparatus of this invention, reference will be made to a preferred embodiment, the structural and operational details of which are schematically set forth in the accompanying drawings.

In the drawings:

FIGURE 1 is a perspective view of a schematic representation of the overall apparatus as employed in a continuous plastic web molding operation;

FIGURE 2 is a schematic representation of the hydraulic and electrical control means employed for imposing the requisite force variations against a movable die component of the molding apparatus; and FIGURE 3 is a graphic representation of the individual phases of a preferred molding cycle.

In FIGURE 1 there is schematically illustrated an automatic molding apparatus including a molding station, a web source of thermoplastic sheet material, feed rolls for transporting the web to the molding station, and outfeed rolls for transporting the web away from the station at the completion of a molding operation.

The molding station includes a stationary heating platen 1 providing a lower heated surface 1a for thermally softening the plastic sheet material. Immediately beneath the platen 1 is reciprocably mounted a die 2. On the upper face of die 2 there is formed a recessed cavity 3 having a configuration corresponding to that of articles to be molded in the plastic web. Die 2 is supported for vertical, reciprocal movement on a piston rod 4 extending from a piston contained within a cylinder 5. Within the die cavity 3, there is positioned an ejector plate 6 for removing molded articles, the structure of which will hereafter be delineated. Around the edge of the cavity 3 is formed a dull knife-edge 7 which functions both to clamp portions of the web to be molded and to sever these portions from the web body at the conclusion of a molding operation. For displacing molded articles transversely from the molding station after they have been separated from the mold by the ejector plate 6, there is included a nozzle 8 for directing a lateral air blast against the separated molded article.

The web 9 is supplied to the molding station from a roll 10. The web is fed through a feed roll assembly including a driving roll 11 and an idler roll 12. A rotary, cyclic motor 13, through interengaged driving gears 14 and 15, is effective to rotate driving roll 11. Idler roll 12 is pivotally supported by pivoted links 16 at each end and is connected to cranks 17 by connecting links 18. Rods 19, extending between cranks 17 and pistons contained within cylinders 20, are effective to rotate cranks 17 so as to move the idler roll 12 away from or toward the driving roll 11.

The outfeed roll assembly for withdrawing the web from the molding station and insuring proper web tension in the station includes a driving roll 21 and an idler roll 22. A rotary, cyclic motor 23, operated concurrently and at the same speed as driving motor 13, motivates the driving roll 21 at the same speed as driving roll 11 through a gear chain including interengaged gears 24 and 25. Idler roll 22 is supported at its opposite ends by pivot links 26. Pivoted cranks 27 are connected to idler roll 22 through means of connecting links 28. The lower, free ends of cranks 27 are pivotally connected to rods 29 which, in turn, extend to pistons contained within cylinders 30. Appropriate movement of these pistons is effective to move the idler roll 22 either away from or toward driving roll 21.

A schematically represented cutter 31 is positioned across the path of web 9 for severing web sections which have been transported through the outfeed roll assembly.

During the operation of the apparatus, idler rolls 12 and 22 are engaged against the web 9 so as to hold this web in driving engagement with drive rolls 11 and 21. Motors 13 and 23 are activated to bring a portion of the web 9 into registered alignment with the heating platen 1 and die 2. Through suitable control means, after the web portion has been thus positioned at the mold station, the die 2 is moved upwardly to clampingly engage and hold the aligned web portion against the heating lower surface 1a of platen 1. As die 2 reaches this position of clamping engagement, the idler rolls 12 and 22 are drawn downwardly so as to allow the motors 13 and 23 to be reset for subsequent feed and outfeed strokes.

With the die holding the web portion against the heating surface 1a of platen 1, this portion will be thermally softened to facilitate its being fluid formed into cavity 3. To insure that the web portion is held in overall engagement with the surface 1a and thus subjected to uniform heating, super atmospheric air is introduced into the cavity 3 to act on the lower surface of the clamped web portion.

After the web portion has been held in engagement with the heating platen 1 for a time sufficient to insure its being adequately softened, super atmospheric air is introduced through the platen 1 to react upon the top of the clamped portion of the web above the cavity 3 so as to fluid form this portion into the configuration of the cavity 3. Where the molded portion is to be retained in the web for subsequent separation, the die 2 is withdrawn downwardly at the conclusion of the molding operation to allow the web to be advanced to a suitable molded article separation station. In the illustrated apparatus, however, the separation of the molded article occurs in the molding station itself. At the completion of the fluid forming of the clamped web portion, the upward force applied to the die 2 is increased so as to cause the knife edge 7, which had been clampingly securing the periphery of the web portion, to penetrate this periphery to physically separate the molded article from the web body. Following this operation, the die 2 is withdrawn downwardly. During this downward movement, the ejector plate 6 moves upward relative to the base of the cavity 3 so as to elevate at least a portion of the molded article above the cavity 3 into the path of a laterally directing air jet issuing from nozzle 8. This blast is effective to move the article laterally from the apparatus as illustrated in FIGURE 1.

Included in the apparatus is a composite hydraulic and electrical control network for selectively varying the hydraulic pressures applied against the piston at the lower end of rod 4 so as to vary the force applied to the die 2 in accordance with a predetermined program. This control apparatus is illustrated schematically in FIGURE 2.

As shown in FIGURE 2, the rod 4, supporting reciprocable die 2, extends to a piston 32 contained within cylinder 5. The ejector plate 6 in die 2 may be actuated to raise a severed article from the mold cavity 3 by any of several known mechanisms after the die 2 has withdrawn from the web 9. In the representative arrangement shown, a rod portion 6a extends downwardly from the ejector plate 6 and passes through the piston rod 4, piston 32, and cylinder 5 to project beyond the cylinder. The length of rod 6a is selected to insure that the projecting rod end will engage a suitable stop surface and immobilize the ejector plate at a suitable height with respect to the air blast nozzle 8. This height should be adjusted to insure that an article supported on the plate 6 will be laterally aligned with the air blast, such that it may be projected laterally out of the molding station after the die 2 has withdrawn downwardly from the immobilized ejector plate 6.

Die 2 includes a passage 33 affording fluid communication between the die cavity 3 and a source of pressurized air 34. Similarly, a passage 35 extends through the platen 1 to provide fluid communication between the lower surface 1a of the platen 1 and a source of fluid pressure 35.

In the air supply conduit system leading from air supply 34 to passage 33 in die 2, there is positioned a conventional pressure regulating valve 37 and a flow controlling, reciprocable, i.e. spool type, valve 38, the operation of which is controlled by a solenoid 39. In the housing of valve 38, there are formed ports *a, b* and *c* which communicate respectively with pressure source 34, a vent to the atmosphere, and the passage 33. With the spool positioned as illustrated, the ports *c* and *b* are in fluid communication so as to allow venting of the passage 33. This spool position would be desired when the web 9 was being fluid formed into the cavity 3. When it is desired to introduce super atmospheric pressure into the passage 33 to react upon the low surface of web 9 to hold the web in overall surface engagement with the heating surface 1*a* of platen 1, the solenoid 39 is appropriately actuated to move the spool of valve 38 to the right to place ports *a* and *c* in fluid communication.

In the air conduit system extending between air supply 36 and passage 35, there is included a conventional pressure regulating valve 40 and a flow controlling spool valve 41. The movement of the reciprocable spool within the valve 41 is controlled by solenoid 42. In the housing of valve 41 there are formed ports *a, b* and *c* which communicate respectively with air source 36, an atmospheric vent, and the passage 35. In the illustrated position, the ports *b* and *c* are in communications so as to allow venting of the passage 35 which would be desired when the web 9 is being held against the surface 1*a* during the web heating operation. When it is desired to supply pressurized air to passage 35, the solenoid 42 is appropriately actuated to cause the spool in valve 41 to move to the right to place housing ports *a* and *c* in fluid communication. To effect proper fluid pressure forming of the web 9, it is contemplated that the air supplied to the port *a* of valve 41 would be at a significantly higher pressure than that of the air supplied to the port *a* of valve 38 where the pressure demand is considerably less.

In the illustrated arrangement, the air source 34 is used to supply nozzle 8. In the air conduit system extending between this source and nozzle, there is included a conventional pressure regulating valve 43 and a flow control valve 44, the operation of which is controlled by a solenoid 45. The housing 44 includes a port *a* communicating with the nozzle 8 and a port *b* communicating with the air supply 34. To supply air to the nozzle 8 for the purpose of laterally ejecting a molded article, the solenoid 45 is actuated to move the spool of valve 44 to the right to place the ports *a* and *b* in fluid communication.

Solenoids 42, 39 and 45, controlling respectively the operation of air control valves 41, 38 and 44, are electrically connected, as schematically illustrated, to a central, block represented, electrical control 46. The circuitry in this control, being conventional, is not illustrated.

For supplying hydraulic fluid to actuate the piston 32, there is included a pump 47 to which fluid is supplied by an hydraulic fluid source 48. The pump 47 is preferably a fixed displacement pump driven by an electric motor. A conduit network is provided for placing the pumping 47 and the cylinder 5 in fluid communication. Included in this conduit network is a spool-type control valve 49 for selectively supplying pressurized fluid to either the piston head end 5*a* or the piston rod end 5*b* of the cylinder 5. In addition to the valve 49, there is included an additional spool-type control valve 50 for selectively placing the ends 5*a* and 5*b* of cylinder 5 in fluid communication. Also included in the conduit system is a conventional, electrically actuated, relief valve 51 which is effective to establish a pressure level within the conduit system at any desired level up to the maximum pressure provided by pump 47 in proportion to an electrical control signal issuing from electrical control 46.

In the housing of control valve 49 there are formed ports *a,b, c* and *d*. A solenoid 52 engages the left end of the reciprocable spool within valve 49 and, when actuated, is effective to place ports *b* and *d* in fluid communication. A solenoid 53 engaging the opposite end of the spool of valve 49, when actuated, places ports *a* and *d* in fluid communication and ports *b* and *c* in fluid communication. In the illustrated rest portion of the spool within valve 49, the ports *a* and *b* are respectively sealed while the ports *c* and *d* are in fluid communication.

Valve 50 includes in its housing ports *a, b* and *c*. In the illustrated rest position of the spool within this valve, ports *a* and *b* are in fluid communication while port *c* is sealed. A solenoid 54 at the left end of valve 50, when actuated, is effective to displace the spool of this valve to the right so as to place ports *a* and *c* in fluid communication. A solenoid 55 at the right end of valve 50, when actuated, establishes fluid communication between ports *b* and *c*.

As with the previously noted pneumatic valve solenoids, hydraulic valve solenoids 52, 53, 54 and 55 are electrically connected to electrical control 46 for predetermined, programmed operation. As will be appreciated, the solenoid actuated valves incorporated in the apparatus include conventional spring return mechanisms to insure their returning to a desired neutral position when their respective actuating solenoids are de-energized.

Extending between the pump 47 and port *d* of valve 49 is a first conduit means A for supplying pressurized fluid to this valve. Extending from port *b*, and branching to communicate with head end 5*a* of cylinder 5 and port *a* of valve 50 is a second, branched conduit means B. A third branched conduit means C extends from port *a* of valve 49 and branches to communicate with the piston rod end 5*b* of cylinder 5 and the port *b* of valve 50.

Extending from port *c* of valve 49 to a suitable sump, here illustrated as the original fluid source 48, is conduit means D. Conduit means E, similarly, provides fluid communication between port *c* of valve 50 and the sump.

When solenoid 52 is actuated to place ports *d* and *b* of valve 49 in fluid communication, pressurized fluid is supplied to the head end 5*a* of cylinder 5 and to the port *a* of valve 50. In the rest position of the spool of valve 50, with solenoids 54 and 55 de-energized, ports *a* and *b* are in fluid communication so as to establish fluid communication between the head and rod ends 5*a* and 5*b*, respectively, of cylinder 5. A check valve 56 is incorporated in conduit means C between port *a* of value 49 and the branched portions leading to cylinder 5 and valve 50. This check valve prevented flow toward the port *a* of valve 49 so as to prevent fluid drainage from the circuit.

The concurrent actuation of solenoids 52 and 53 in valve 49 and 50, respectively, establishes a differential or regenerative circuit for applying differential pressures to the piston 32. Because of the communication between the ends 5*a* and 5*b* of the cylinder 5 the head and rod ends of the piston are exposed to the same fluid pressure. However, as the head end is larger than the rod end by an area equal to that occupied by the rod 4, a net upward force will be imposed upon the piston in this circuit arrangement. The total force applied would equal the pressure in the conduit system multiplied by the difference in area of the exposed surfaces of the head and rod ends of the piston. With the differential circuit established as the piston translates upwardly, fluid displaced by the rod end 5*b* will return to the head end through the communicating conduit means B and C. Due to this oil return circuit, the piston will translate more rapidly than if the fluid pressure were applied to the head end 5*a* only, as in a conventional circuit. However, the force applied, being proportional to the differential in area of the head and rod ends of the piston, will be less than that which would be achieved in the conventional circuit where fluid pressure acts upon the head end only of the piston and thus is proportional to the exposed area of this end.

If, with the solenoid 52 of valve 49 actuated, the solenoid 55 of valve 50 is actuated, a conventional circuit is established and fluid pressure is applied to the head end 5a only of the cylinder 5. With this positioning of the valves 49 and 50, pressurized fluid will enter the head end 5a of cylinder 5 and fluid will be discharged from the rod end 5b for passage through conduit means C and aligned ports b and c of valve 50 to conduit means E for ultimate discharge to the sump. As compared to the heretofore described differential circuit, this conventional circuit would effect comparatively low velocity movement of the piston 32 under a relatively high moving force.

For effecting the return of the piston to its lower position, the solenoid 53 is actuated in valve 49, as in the solenoid 54 in valve 50. With these solenoids thus actuated, ports d and a of valve 49 are placed in fluid communication to allow pressurized fluid to flow through conduit means C to the rod end 5b of cylinder 5. Fluid discharged from head end 5a of cylinder 5 by downward movement of piston 32 passes through branched conduit means B to port b of valve 49 and port a of valve 50. Port b of valve 49, being placed in fluid communication with port c of this valve, allows discharge from conduit means B into conduit means D which discharges into the sump. Port a of valve 50, being fluid communicated with port c of this valve, allows parallel discharge of fluid from conduit means B into conduit means E for ultimate discharge to the sump. This parallel discharge, of course, enables a relatively rapid die return.

It will readily be appreciated that by converting from the differential to the conventional circuit, a pressure change of predetermined ratio may be instantaneously imposed upon the piston 32. The relief valve 51 further augments the possibilities in pressure variations which may be imposed on the piston 32. In response to an appropriate signal from the electrical control 46, a relief valve element in valve 51 may be positioned to obtain any desired reduction from the maximum pressure level in the conduit system created by pump 47.

Control 46, including conventional timing mechanisms, determines the sequential positions of hydraulic valves 49, 50 and 51 as well as the sequence of operation of the air valves 38, 41 and 42. For initiating various phases of the overall molding operation and imparting actuating signals to control 46, there are provided conventional limit switches 57, 58 and 59 adapted to be actuated by a projection 60 extending from die 2 during movement of die 2. Augmenting these control actuating mechanisms, in the preferred embodiment of the apparatus, is an additional limit switch 61 adapted to be actuated by a rotary cam 62 driven by rotary motor 13 of the feed roll mechanism through a drive chain including interengaged gears 14 and 63.

The overall sequence of operational phases or steps involved in the molding operation is set forth graphically in FIGURE 3. As indicated in Step 1, movement of the die 2 is initiated at low velocity and with a relatively high force applied to the die. This high force, accelerating action, which effectively overcomes the inertia of the piston during its initial upward movement, is effected by utilizing the conventional hydraulic circuit. This circuit, as previously noted, is formed through actuation of solenoids 52 and 55 in valves 49 and 50, respectively, so as to direct pressurized fluid against the head end 5a only of the cylinder 5. The signals emanating from electric control 46 for actuating solenoids 52 and 55 may originate from a main starting section in the control or, during continuous operation of the machine, may initiate as a result of the engagement of feed motor driven cam 62 with limit switch 61 at the end of a feed stroke. Although not illustrated in FIGURE 2, limit switch 61 would be electrically connected with electric control 46.

After a predetermined time interval, contemplated as being on the order of .02 to .05 seconds, and determined by a conventional timer mechanism within control 46, solenoid 55 is de-energized to return the spool in valve 50 to the illustrated rest position and establish a differential circuit by placing the head end 5a and rod end 5b of cylinder 5 in fluid communication. With this circuit, the fluid displaced by the upwardly moving piston will be resupplied to the circuit. As a result, the piston 32 and its supported die 2 will accelerate to an increased upward velocity but will move under a reduced imposed force.

As the die 2 continues to move upwardly at a relatively high speed, the die carried projection 60 will engage limit switch 58 to transmit a control signal to electric control 46. Control 46 will react to this signal to again energize solenoid 55 and re-establish the conventional circuit so as to slow the movement of the die 2 as it approaches clamping engagement with a portion of the web 9.

When limit switch 58 is engaged, the generated control signal may also be utilized to adjust the overall system pressure to insure that the die 2 will engage the web 9 with a suitable clamping pressure. This pressure, which will be dependent upon the size of the die, the nature of the clamping edge 7, the thickness of web 9, and the physical characteristics of the material of the web, must be selected to insure that the web portion to be formed will remain clamped during the heat softening process without the web being penetrated or unduly weakened by the edge 7 of die 2. It has been found that, with conventional plastic sheet stock material, the pressure should be somewhat higher than the optimum die advancing pressure.

In addition to decelerating the die 2 and adjusting the clamping pressure, the control signal emanating from limit switch 58 may effect the actuation of solenoid 39 in valve 38 to direct super atmospheric air to passage 33 of die 2. In this way as the web 9 is clamped, the web portion within die edge 7 will be supported, without sagging, against heating surface 1a for uniform thermal softening during Step 2 of the operation.

Under certain molding operations, it may be desired to reduce the pressure applied to die 2 for the purpose of clamping a web portion for thermal softening. To permit such a pressure reduction, limit switch 57 is utilized. Immediately before, or as die 2 engages the web 9 such that knife edge 7 clampingly secures a portion of the web against heater surface 1a of platen 1, the die appendage 60 will engage limit switch 57 and transmit a control signal to electric control 46. In response to this signal, solenoid 55 will again be de-energized so as to return the spool of valve 50 to the illustrated neutral position and re-establish the differential hydraulic circuit. In this way, the pressure applied to die 2 will be materially reduced while the portion of web 9 is being held in engagement with surface 1a and is being heat softened. This reduction in pressure will offset the possibility of the occurrence of inadvertent penetration of the web 9 by the edge 7 during the heat softening process.

As the conversion of the hydraulic circuit to a differential circuit will effect a drastic reduction in pressure applied to the die, it may be desired to raise the overall circuit pressure to partially offset this reduction. This may be accomplished, for example, by partially closing the relief valve 51 in response to the control signal generated by either limit switch 58 or limit switch 57 as the die 2 is being slowed in its approach to the web 9.

A control signal, from limit switch 57, if desired, may be utilized in lieu of a control signal from limit switch 58 for actuating solenoid 39 to supply web supporting air to cavity 3.

In order that the feed and outfeed motors 13 and 23 might be reset during the molding phase in preparation for a subsequent feeding step, the control signal emanating from limit switch 57 may be employed to actuate the pistons in cylinders 20 and 30 so as to withdraw idler rolls 12 and 22 and thus free the drive rolls 11 and 21 for resetting.

After the web portion has been heat softened for a time determined by a timer in electric control 46, fluid pressure is applied to the upper surface of the clamped portion of web 9 to initiate Step 3 of the operation wherein this portion is fluid pressure formed into the cavity 3 or die 2. A control signal generated by the timer at the conclusion of this interval is effective to actuate solenoid 42 such that high pressure forming air may be supplied to the passage 35 in platen 1 and react upon the upper surface of the clamped web portion. To allow venting of the air in cavity 3, solenoid 39 is de-energized to open the cavity to the atmosphere through valve 38. In order to offset the die and platen separating tendency created by the high pressure forming fluid thus introduced into the closed mold members, the conventional hydraulic circuit is restored, if the circuit had been converted to a differential circuit as previously set forth, to increase the clamping pressure applied by edge 7. This condition may be restored by actuating solenoid 55 in response to a time controlled signal from control 46 at the conclusion of the heat softening step.

To augment the clamping pressure applied by edge 7 during the pressure forming phase, the timer control signal generated by electric control 46 may further close relief valve 51 to increase the overall conduit system pressure.

In connection with the raising of the pressure or force applied to the die 2, it should be remembered that the forming air introduced through passage 35 will cool the web 9 so as to reduce to some extent the tendency for the edge 7 to penetrate this web.

Where the pressure formed article contained within cavity 3 is to be cut in place by the knife edge 7, the pressure applied to the knife edge 7 and die 2 is further raised for web cutting Step 4. This pressure increase may be effected at the termination of a predetermined interval, as determined by a timer included in electric control 46 and sufficient to insure the complete pressure forming of the article. This control signal, through control 46, will further close relief valve 51 to materially increase the conduit system pressure such that the pressure applied to the head end of piston 32 will be sufficient to cause the knife edge 7 of die 2 to physically penetrate the web 9 and sever the molded article. A time determined control signal may also be utilized at this stage to de-energize solenoid 42 in valve 41 and allow venting of the pressurized article forming air.

After the molded article has been severed from the web 9, the mold die 2 during Step 5 is started in its withdrawal from the web 9 and platen 1. This withdrawal may be initiated in response to a control signal generated by a timer within electric control 46. This control signal will de-energize solenoid 52 and energize solenoid 53 of valve 49 so as to direct pressurized fluid to the rod end 5b of cylinder 5. Concurrently, solenoid 55 of valve 50 will be de-energized and solenoid 54 of this valve energized. With valves 49 and 50 thus activated, fluid pressure will be supplied through conduit means C to the rod end 5b of piston 32 to cause it to move downwardly. Fluid displaced from head end 5a of cylinder 5 by downward movement of piston 32 will pass through aligned ports b and c of valve 49 and aligned ports a and c of valve 50 for parallel passage to the sump 48, through conduit means D and E respectively.

In the final Step 6 of the molding operation, the molded article is separated from the mold and moved laterally from the molding station. This is accomplished through the joint action of the ejection plate 6 and air blast nozzle 8 illustrated in FIGURE 2. When the die 2 has moved downwardly to an extent sufficient to cause the rod 6a to engage the stop at its lower end, the molded article will be held stationary on plate 6 as the die 2 further recedes downwardly so as to expose the article to the aligned nozzle 8. When the die 2 has moved downwardly sufficiently to cause the die projection 60 to engage the limit switch 59, a suitable control signal is generated by the switch and transmitted to the electric control 46 so as to actuate solenoid 45 in valve 44. Through this solenoid actuation, pressurized air is supplied to nozzle 8 from which it issues as a jet blast directed laterally against the exposed and die separated molded article to move the article laterally out of the molding station.

When the limit switch 59 is actuated, its general control signal may be employed to restore the relief valve 51 to the die advancing position and to de-energize solenoids 53 and 54 to restore the hydraulic circuit to the neutral position illustrated in FIGURE 2. In this position, the spool in valve 49 is centered such that the pressurized fluid originating at pump 47 is recycled through communicating ports d and c of valve 49 for return to the sump.

If the electric control 46 is arranged to cause continuous, automatic operation of the apparatus, the die 2 will remain momentarily in the lower or retracted position until the limit switch 61 is again actuated at the end of a feed stroke which positions a new portion of web 9 in alignment with the mold platen and die members. When this alignment has occurred, upward movement of the mold will be reinitiated and the overall molding cycle repeated.

A specific concept as to the pressure variations effected during the various steps of the molding operation may be gathered through analysis of the dimensions and system pressures employed in a preferred form of the apparatus. The die is dimensioned to mold a web portion with a maximum area 24 inches in length and 21 inches in width. The head end of the piston has a diameter of approximately 6 inches while the rod at the end of the piston has a diameter on the order of 4¼ inches. The area of the rod projection 6a extending from the ejector plate through the piston 32 is of such small magnitude that it may be ignored for the purpose of this analysis. Thus, it will be readily seen that the area ratio between the head and rod ends of the piston 32 is approximately 2 to 1. Thus, when the conventional circuit is converted to a differential circuit, the net pressure applied to the piston is substantially halved.

During the initial movement of the mold, including the low speed, high force acceleration and the subsequent high speed, low force movement, the relief valve 51 is adjusted to provide a system pressure of between 300 and 500 p.s.i. In the previously described mode of operation of the apparatus, where the line pressure is increased when the die is decelerated before engaging the web 9, it is contemplated that this pressure would be on the order of 400 to 600 p.s.i. During the air pressure forming of the heat softened sheet material, the line pressures are materially increased to between 1000 and 1200 p.s.i. and are raised to between 1800 and 2000 p.s.i. to effect the severing of the formed portion by the knife edge 7. When the die is to be returned after the completion of a molding operation, the line pressure is reduced to between 200 and 300 p.s.i.

The hydraulic pressures heretofore set forth are envisaged for use when molding presently commercially available, plastic sheet stock material. However, as the hydraulic pump contemplated for incorporation in the system would have a capacity of approximately 2000 p.s.i. pressure, the system pressures may be varied considerably to suit whatever molding conditions may be present.

In the pneumatic system of the apparatus, the pressure applied to hold the sheet 9 in engagement with the heating platen during the heating operation may be on the order of 75 to 100 p.s.i. The air pressure supplied for pressure forming the heat softened plastic sheet may be approximately 250 p.s.i. Obviously, however, these pressures may be altered as required.

In describing the apparatus and method of this invention, the several advantages inherent therein have been demonstrated. The disclosed programming of forces applied to the movable mold member, i.e. die 2, are such as to efficiently utilize the available power, to avoid damage to the apparatus through the use of excessive die moving forces, and to insure that optimum die forces are applied during all critical phases of the molding operation. The hydraulic system disclosed, in conjunction with the electrical control system, affords flexibility and ease in overall operation and control of the system. The utilization of the differential hydraulic circuit in conjunction with a relief valve for determining the overall pressure level in the system enables the attaining of large pressure changes very rapidly. These changes may be obtained on a predetermined ratio basis but modified to obtain pressures between the ratio levels as required by operating conditions. Indeed, the two control methods permit the force available at the die to be scheduled over a variation ratio which in practice has been determined to be on the order of 50 to 1.

A particular advantage in the hydraulic and control system resides in the ease with which the programming of the pressure variations may be modified to suit individual molding operation requirements. By merely rewiring the electrical control circuit in a conventional manner, desired modifications in scheduling of valve actuation may readily be effected. The use of timers and limit switches in the control system also facilitates the making of changes in the programming of pressures applied to the die.

While the invention has been described with reference to a preferred embodiment, modifications in this embodiment, in addition to those disclosed, may occur to those skilled in the molding art. In the article ejection mechanism, for example, a mechanical ejection device other than that disclosed may be employed or, alternatively, an upwardly directed air blast directed against the lower surface of the molded article in the cavity 3 may be employed. Valve structures, other than those schematically disclosed, may be utilized. A web heating arrangement different from the type disclosed may be incorporated in the mold and subatmospheric pressures may be applied during the web supporting and pressure forming steps. Such departures from the disclosed method and apparatus, however, are well within the scope of the invention as defined in the appended claims.

I claim:

1. An hydraulic apparatus for molding thermoplastic sheet material, said apparatus comprising: a stationary, heating platen, a cavity containing die supported on a piston rod for reciprocable movemnet toward and away from said platen, said piston rod extending from an hydraulic fluid actuated, cylinder housed, piston; means for initiating movement of said die toward said platen at relatively low velocity with relatively high hydraulic force being applied to said piston; means for accelerating the initial movement of said die to a relatively high velocity with relatively low hydraulic force being applied to said piston; means for decelerating said movable die before it engages and clamps a portion of said plastic sheet material against said platen; means for adjusting the hydraulic force applied to said piston such that said die clamps said plastic sheet material portion against said heating platen to effect its thermal softening without penetrating said sheet; means for increasing the hydraulic force applied to said piston; and means for forming said sheet portion into conformance with said die cavity by the application of pressurized fluid thereto while said sheet portion is clamped by said die and platen and said piston is subjected to said increased hydraulic force.

2. An apparatus for molding thermoplastic sheet material, said apparatus comprising: a stationary, heating platen; a cavity containing die supported on a piston rod for reciprocable movement toward and away from said platen, said piston rod extending from an hydraulic fluid actuated, cylinder housed, piston; a source of pressurized hydraulic fluid; a conduit system for supplying pressurized fluid from said source to said piston housing cylinder; first, solenoid actuated, spool valve means in said conduit system for selectively directing said fluid against the head or rod end of said piston; second, solenoid actuated, spool valve means in said conduit system for selectively placing the piston head and piston rod ends of said cylinder in fluid communication; said conduit system including first conduit means extending between said source of pressurized fluid and said first valve means, second conduit means extending from said first valve means and branching to communicate with the piston head end of said cylinder and said second valve means; and third conduit means extending from said first valve means and branching to communicate with the piston rod end of said cylinder and said second valve means; third, electrically operated, relief valve means for selectively venting said first conduit means to attain any desired pressure level in said conduit system below that of said source; and electrical control means for actuating said valve means according to a predetermined sequence to selectively impose different fluid pressures on said piston at predetermined intervals.

3. A method of molding thermoplastic sheet material, said method comprising: initiating low velocity movement of a reciprocable, cavity containing, die toward a heating surface; accelerating the movement of said die toward said surface; decelerating the movement of said die before it engages and clamps a portion of said plastic sheet material against said heating surface; adjusting the force applied to said die to cause said die to clamp said sheet portion against said heated surface to effect its thermal softening without penetrating said sheet; increasing the sheet clamping pressure applied by said die; and forming said sheet portion into conformance with a die cavity by the application of pressurized fluid thereto while said sheet portion is being secured by said increased clamping pressure.

References Cited by the Examiner

UNITED STATES PATENTS

| | | | |
|---|---|---|---|
| 2,268,026 | 12/41 | Ernst et al. | |
| 2,273,713 | 2/42 | Lawyer. | |
| 2,326,041 | 8/43 | Lavallee | 18—19 |
| 2,437,109 | 3/48 | Marquatt | 18—24 |
| 2,694,227 | 11/54 | Fordyce et al. | 264—92 |
| 2,711,567 | 6/55 | Knapp | 18—30 X |
| 2,765,493 | 10/56 | Winstead | 18—19 |
| 2,911,677 | 11/59 | Weber | 264—92 |
| 2,926,385 | 3/60 | Willson | 18—56 X |
| 2,973,558 | 3/61 | Stratton. | |
| 3,004,288 | 10/61 | Gardner | 18—56 |
| 3,007,206 | 11/61 | Griswold | 18—56 |
| 3,041,669 | 7/62 | Marshall et al. | 18—19 |
| 3,126,583 | 3/64 | Haberle | 18—19 |

WILLIAM J. STEPHENSON, *Primary Examiner.*

MORRIS SUSSMAN,
ALEXANDER H. BRODMERKEL, *Examiners.*